United States Patent [19]
Hawkins

[11] Patent Number: 4,475,073
[45] Date of Patent: Oct. 2, 1984

[54] PROPORTIONAL PLUS INTEGRAL SERVO-REVERSIBLE SPEED CONTROL

[75] Inventor: Royal R. Hawkins, Bloomington, Minn.

[73] Assignee: Sundstrand Corporation, Rockford, Ill.

[21] Appl. No.: 397,491

[22] Filed: Jul. 12, 1982

[51] Int. Cl.³ ............................................. G05B 11/36
[52] U.S. Cl. ..................................... 318/609; 318/618
[58] Field of Search .............. 318/609, 618, 328, 326, 318/327, 398, 463, 464; 60/395, 448

[56] References Cited

U.S. PATENT DOCUMENTS

| | | | |
|---|---|---|---|
| 2,939,285 | 6/1960 | Hawkins | 60/395 |
| 2,977,765 | 4/1961 | Fillmore | 60/382 |
| 3,529,422 | 9/1970 | Herndon | 60/395 |
| 3,901,031 | 8/1975 | Knapp et al. | 60/395 |
| 4,090,116 | 5/1978 | Lippitt | 318/327 X |
| 4,227,137 | 10/1980 | Hartman | 318/327 X |
| 4,232,257 | 11/1980 | Harshberger | 318/328 X |
| 4,236,106 | 11/1980 | Davis et al. | 318/599 |
| 4,350,940 | 9/1982 | Dupont | 318/618 X |

*Primary Examiner*—Ulysses Weldon

*Attorney, Agent, or Firm*—Wood, Dalton, Phillips, Mason & Rowe

[57] ABSTRACT

A proportional plus integral servo-reversible speed control for use in a system driving a load in either a forward or reverse direction of travel at a desired output speed. The servo-reversible speed control includes a control handle for providing a command voltage having a magnitude proportional to the desired output speed for travel in the reverse direction and having a magnitude inversely proportional to the desired output speed for travel in the forward direction. A pulse pickup device and frequency to voltage converter provide a voltage proportional to the actual output speed, the actual speed voltage being applied to both an inverting and noninverting amplifier. The actual speed voltage is applied as feedback to a proportional plus integral circuit from the noninverting amplifier for sensed travel in the reverse direction or from the inverting amplifier for sensed travel in the forward direction to provide a closed loop speed control for travel in one direction, down through zero speed and up in the opposite direction. The proportional plus integral circuit is responsive to the command voltage and the actual speed voltage gated thereto to generate a speed control signal which maintains the output speed of the system constant.

19 Claims, 1 Drawing Figure

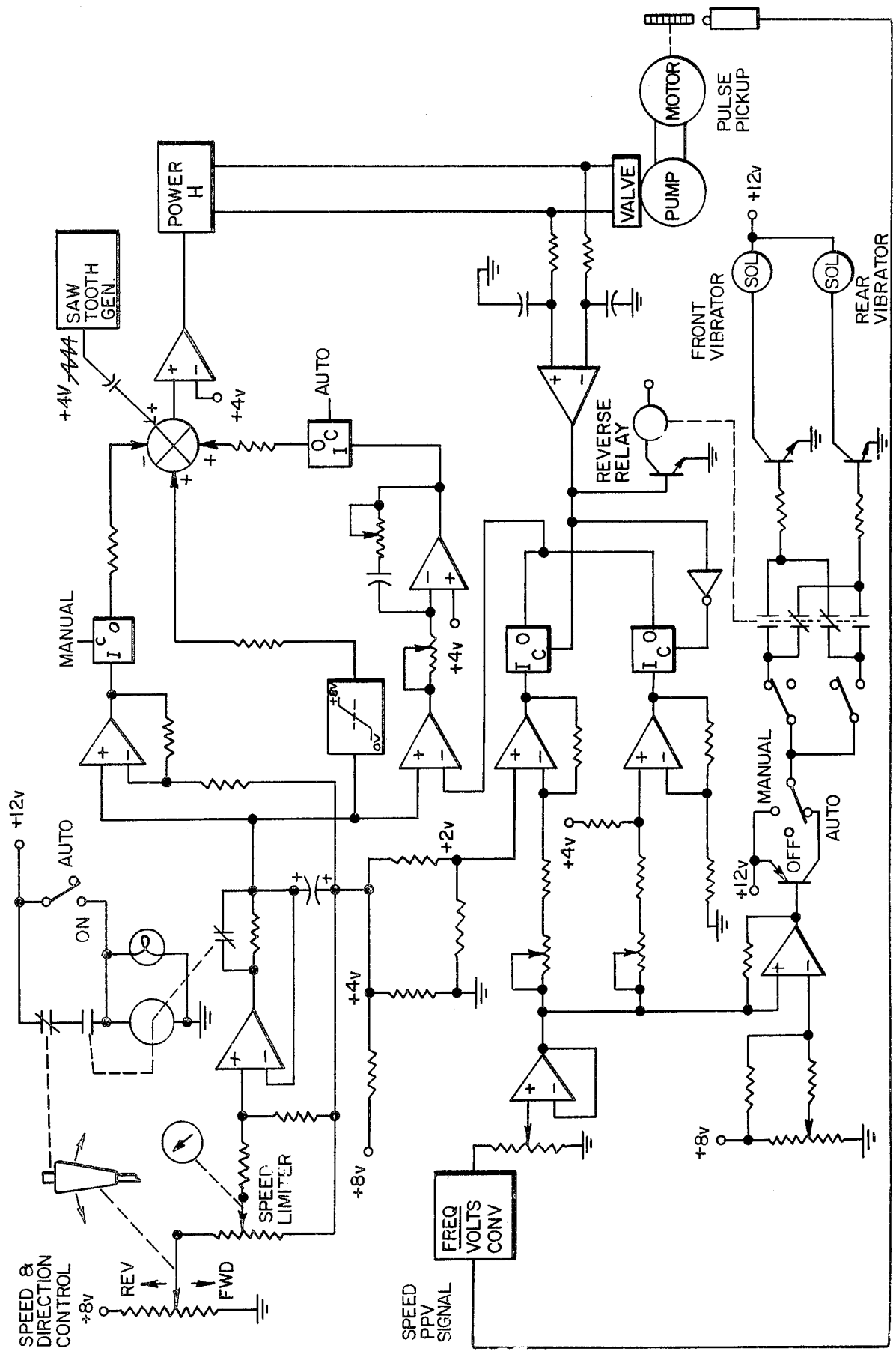

PROPORTIONAL PLUS INTEGRAL SERVO-REVERSIBLE SPEED CONTROL

BACKGROUND OF THE INVENTION

The present invention is directed to a proportional plus integral, full servo-reversible speed control for a system driving a load in both a forward and reverse direction of travel.

Known closed loop speed controls for systems providing travel in one direction typically include a pulse pickup device for sensing the actual speed of an output shaft to provide feedback information which is used to maintain the actual output speed within a given range of the desired output speed. However, because pulse pickup devices are not sensitive to the direction of travel of the output, they have not been employed in known closed loop speed controls for systems providing travel in both a forward and reverse direction.

An object of the invention is to provide a full servo-reversible speed control for travel in one direction, down through zero speed and up in the opposite direction, the control employing a pulse pickup device for providing feedback information indicative of the actual speed of the output.

A further object of the invention is to provide a proportional plus integral servo-reversible speed control for a system providing motion in both a forward and reverse direction.

The servo-reversible speed control includes a control member which provides a command voltage having a magnitude proportional to the desired output speed for motion in a first direction and having a magnitude inversely proportional to the desired output speed for motion in a second direction. A pulse pick-up device and frequency to voltage converter provide a voltage proportional to the actual output speed, the actual speed voltage being applied to both an inverting and noninverting amplifier. The actual speed voltage is applied as feedback to a proportional plus integral circuit from the noninverting amplifier for sensed motion in the first direction or from the inverting amplifier for sensed motion in the second direction to provide a closed loop speed control for motion in one direction, down through zero speed and up in the opposite direction. The proportional plus integral circuit is responsive to the command voltage and the actual speed voltage gated thereto to maintain the output speed constant.

The speed control includes an acceleration/deceleration limiter which is responsive to the command voltage to provide an essentially linear rate of acceleration or deceleration.

The speed control also includes a saturation gain stage for generating a step voltage output which is combined with the output of the proportional plus integral circuit to overcome the deadband between the threshold of motion in the first and second directions.

For use in a vibratory compactor having front and rear vibrators, the speed control includes an automatic start control which automatically actuates the vibrators in response to the actual speed and direction of travel of the compactor.

Further advantages of the invention will be apparent from the following specification and the drawing.

BRIEF DESCRIPTION OF THE DRAWING

The drawing is a schematic diagram of the proportional plus integral servo-reversible speed control.

Specification

The servo-reversible speed control of the present invention is used to control the output speed of a system driving a load in either a forward or reverse direction of travel. Although the control shown includes an automatic vibrator start for use in a vibratory compactor as described below, the speed control may be used in other systems providing motion in opposite directions.

As shown in FIG. 1, the servo-reversible speed control is used in a system having a hydrostatic transmission 10 which includes a pump 12 in communication with a motor 14 through a pair of conduits 16 and 18 to supply fluid under pressure to the motor. The motor 14 in turn drives a load in either a forward or reverse direction of travel, the load being coupled to the motor by means of an output shaft 20. The speed and direction of travel of the output shaft 20 are controlled by a valve 22 which sets the displacement of the pump 12 in response to the magnitude and polarity of the drive current provided on lines 24 and 26 by a servo reversible drive 28, designated power H.

Power H 28 is a bridge type, time proportioning switching drive which responds to the duty cycle of a speed control signal output on a line 30 from a comparator 32 to provide positive current on line 24 for high outputs of the comparator and to provide positive current on line 26 for low outputs of the comparator. For positive current on line 24, the valve 22 operates to control the pump 12 to supply fluid under pressure to the motor 14 for travel in the forward direction and for a positive current on line 26, the valve 22 controls the pump to supply fluid under pressure to the motor for travel in the reverse direction.

The control system may be operated in either a manual mode, providing an open loop proportional speed control through a path 34 or in an automatic mode, providing a closed loop proportional plus integral speed control through a path 36. To initiate operation in the automatic mode, a switch contact 38 is momentarily moved to an "ON" position 39, powering a relay 40 through a line 42. When actuated, the relay 40 closes a pair of normally open contacts 44 and opens a pair of normally closed contacts 46, the contacts 44, when closed, latching the relay 40 on through a pair of normally closed contacts 48. When the relay 40 is latched on a gating signal is applied to an analog switch 50 to provide the closed loop proportional plus integral speed control through path 36. A light 52, connected in parallel with the relay 40, provides an indication of operation in the automatic mode.

A manual override is provided by a push button 54 on a control handle 56. When actuated, the push button 54 opens the normally closed pair of contacts 48 to terminate operation of the relay 40 and provide operation in the manual mode. In the manual mode, a gating signal is applied to an analog switch 58 to provide the open loop proportional speed control through path 34.

The control handle 56 positions a wiper arm 60 of a potentiometer 62 connected between +8 volts and ground to provide a speed command voltage. Movement of the control handle 56 for travel in the reverse direction from a neutral or stop position provides a command voltage which is proportional to the desired output speed; whereas, movement of the control handle for travel in the forward direction provides a control voltage which is inversely proportional to the desired output speed. The control handle potentiometer 62 is connected to a speed limiter potentiometer 64, the wiper arm of which is positioned by a knob 68 to set the maximum output speed of the hydrostatic transmission 10.

The command voltage provided by the speed limiter potentiometer 64 is applied to the non-inverting input terminal of an op amp 70 through a voltage divider comprised of a resistor 72 and a resistor 74 connected to a +4 volt reference on a line 76. In the automatic mode of operation, the normally closed pair of contacts 46 are opened by the relay 40 so that the output of the op amp 70 is applied to an acceleration/deceleration limiter 78. In the manual mode of operation, the output of the op amp 70 bypasses the acceleration/deceleration limiter 78 through the normally closed pair of contacts 46 and is fed back to the inverting input terminal of the op amp 70.

The acceleration/deceleration limiter 78 includes a non-polar 25 $\mu$f capacitor 80 connected to the output of the op amp 70 through a resistor 82, the voltage across the capacitor being applied as feedback to the inverting input terminal of the op amp 70. The capacitor 80 is also connected to the +4 volt reference on line 76 to prevent false command signals when power to the system is initially turned on. The op amp 70 compares the actual voltage on the capacitor 80 to the speed command voltage and maintains the output high or low until the capacitor voltage matches the command voltage to provide an essentially linear rate of acceleration or deceleration. As long as the useful voltage swing on the 25 $\mu$f capacitor 80 is only one-third of the maximum swing out of the op amp 70, the true accumulated voltage on the capacitor follows an exponential but only to 50% of the RC time constant so that the finishing slope or rate of change of the voltage is one-half of the starting slope at the highest speed setting, lower speed settings being more linear.

The speed command voltage from the op amp 70, provided on a line 84, has a maximum value of +5 volts for a speed command of full reverse, a value of +4 volts for a zero speed command, and a value of +3 volts for a speed command of full forward. The speed command voltage on line 84 is applied to a line 86 of the manual mode path 34 providing the open loop proportional speed control and to a line 88 of the automatic mode path 36 providing the closed loop proportional plus integral speed control. The speed command voltage is also applied to a saturation gain stage 92. The output of the saturation gain stage 92 and the output of either the manual mode path 34 or the automatic mode path 36 are combined by a summing junction 94 with a one volt peak to peak, 400 hz sawtooth wave having a base line of +4 volts so that it varies from ±3.5 volts to ±4.5 volts. The sawtooth wave is provided by a sawtooth generator 96 which is connected to the summing junction 94 through a capacitor 98. The output of the summing junction 94 is applied to the comparator 32 to provide a time-proportional or pulse width modulated control signal on line 30 to power H 28.

The saturation gain stage 92 is an inverting, nonlinear amplifier which responds to small but sudden changes in the speed command voltage on line 84. When the speed command voltage crosses +4 volts, indicating a change in the commanded direction of travel, the saturation gain stage provides a step voltage output to the summing junction 94 to overcome the dead band in the hydraulics when going from travel in one direction through the stop position to travel in the opposite direction. The output of the saturation gain stage 92 is applied to the summing junction 94 through a resistor 100 to provide 4±0.03 volts at the junction, 4.03 volts for a speed command of full forward and 3.97 volts for a speed command of full reverse.

For the manual mode path 34 the speed command voltage on line 86 is applied to the noninverting input terminal of an op amp 102 having a feedback path connected to the inverting input terminal thereof through a resistor 104 which is connected to the +4 volt reference on line 76 through a resistor 106. The output of the op amp 102 is gated to the summing junction 94 through a resistor 108 by the analog switch 58 when operating in the manual mode. The voltage applied to the summing junction 94 from the op amp 102 is 4±0.5 volts, 4.5 volts for a speed command of full reverse and 3.5 volts for a speed command of full forward. The signal from the manual path 34 is subtracted by the summing junction 94 from the signal applied from the saturation gain stage 92 to alter the base line of the sawtooth wave applied on line 110.

When operating in the manual mode with a full reverse speed command so that +5 volts appears on line 84, the summing junction 94 subtracts the +4.5 volts provided by the manual path 34 from the +3.97 volts provided by the saturation gain stage 92 to lower the base line of the sawtooth wave by 0.53 volts. The resulting signal output from the summing junction 94, applied to the noninverting input terminal of the comparator 32, is a sawtooth wave which varies from +2.97 volts to +3.97 volts. The comparator 32 compares the signal applied from the summing junction 94 to a +4 volt reference applied to the inverting input terminal thereof, the output of the comparator 32 for a speed command of full reverse when operating in the manual mode going low. The low output of the comparator 32 causes power H 28 to provide positive current on line 26 for travel in the reverse direction at maximum speed.

When operating in the manual mode with a full forward speed command so that +3 volts appears on line 84, the summing junction 94 subtracts +3.5 volts provided by the manual path 34 from +4.03 volts provided by the saturation gain stage 92 to raise the base line of the sawtooth wave on line 110 by 0.53 volts. The resulting signal output from the summing junction 94 and applied to the comparator 32 is now a sawtooth wave which varies from +4.03 volts to +5.03 volts, causing the output of the comparator on line 30 to go high. The high output on line 30, in turn, causes power H 28 to provide positive current on line 24 for travel in the forward direction at maximum speed.

If the control handle 56 is in the neutral position such that a zero speed command of +4 volts appears on line 84, the outputs of the manual mode path 34 and the saturation gain stage 92 applied to the summing junction are both +4 volts thereby cancelling each other. The output of the summing junction 94 applied to the comparator 32 is thus the sawtooth wave on line 110 which varies from +3.5 volts to +4.5 volts, causing the output of the comparator to be a square wave having a 50% duty cycle. Although power H 28 is providing positive current half of the time on line 24 and half of the time on line 26, the net effect on the valve 22 is zero displacement because of the high frequency output of the comparator 32.

For the automatic mode path 36, the speed command voltage appearing on line 84 is applied to the noninverting input terminal of a comparator 112. A feedback voltage representing the actual output speed of the hydrostatic transmission 10 is applied to the inverting input terminal of the comparator 112 from either an inverting amplifier 114 for sensed travel in the forward direction or from a noninverting amplifier 116 for sensed travel in the reverse direction to provide a full servo-reversible speed control.

The feedback signal is provided by a pulse pickup device 118 which senses the speed of a rotating gear 120 mounted on the output shaft 20 and which generates a pulse train, the frequency of which is proportional to the actual speed of the output shaft. The pulse train from the pulse pickup device 118 is applied to a frequency to voltage converter 122 to provide a voltage proportional to the actual speed of the output shaft 20. The actual speed voltage is applied to the noninverting input terminal of an op amp 124 through a frequency to voltage calibration potentiometer 126, the output of the op amp 124 being fed back to the inverting input terminal thereof. The calibration potentiometer 126 is set so that the output of the op amp 124 goes from 0 to +1 volts at maximum operating speed in either the forward or reverse direction of travel.

The output of the op amp 124 is applied to the inverting amplifier 114 through a potentiometer 128 connected in series to a resistor 130, a resistor 132 being connected in a feedback path between the output of the amplifier 114 and the inverting input terminal thereof. The noninverting input terminal of the amplifier 114 is connected to a +2 volt reference provided by a voltage divider network 134 comprised of resistors 136, 138, 140 and 142 so that at maximum operating speed in either the forward or reverse direction of travel, the output of the inverting amplifier 114 drops from +4 volts to +3 volts.

The output from the op amp 124 is also applied to the noninverting amplifier 116 through a potentiometer 144 connected in series with a resistor 146, the noninverting input terminal being connected to a +4 volt reference through a resistor 148. The output of the amplifier 116 is fed back to the inverting input terminal thereof through a resistor 150 which is connected to ground through a resistor 152. At maximum operating speed in either the forward or reverse directions, the output of the noninverting amplifier 116 rises from +4 volts to +5 volts.

Because the pulse pickup device 118 does not differentiate between forward and reverse directions of travel, the polarity of the drive current output from power H 28 is sensed to provide direction information used to gate the actual speed voltage from either the inverting amplifier 114 for the forward direction of travel or from the noninverting amplifier 116 for the reverse direction of travel. The polarity of the drive current is sensed by a comparator 154 having a noninverting input terminal connected to line 24 through an RC filter comprised of a resistor 156 which is connected to ground through a capacitor 158. The inverting input terminal of the comparator 154 is connected to line 26 through an RC filter comprised of a resistor 160 which is connected to ground through a capacitor 162. The comparator 154 senses the polarity of the drive current through the lines 24 and 26, the output of the comparator going high for positive currents on line 24 and the output going low for positive currents on line 26. A high output from the comparator 154 indicates travel in the forward direction and gates an analog switch 164 so that the output of the inverting amplifier 114 is applied to the comparator 112. A low output from the comparator 154, when inverted by an inverter 166, gates an analog switch 168 so that the output of the noninverting amplifier 116 is applied to the comparator 112 for sensed travel in the reverse direction.

The comparator 112 compares the speed command voltage from line 88 to the actual speed feedback voltage gated thereto to provide a voltage proportional to the difference therebetween. The output of the comparator 112 is applied to an integrator generally designated 170 having a gain control provided by a potentiometer 172, the integrator altering the output of the comparator 32 to maintain the output speed of the hydrostatic transmission 10 constant. The integrator 170 includes an op amp 174 having a proportional gain potentiometer 176 connected in series with a capacitor 178 between the output of the op amp 174 and the inverting input terminal thereof. The noninverting input terminal of the op amp 174 is connected to a +4 volt reference, the inverting input terminal of the op amp receiving the difference signal output from the comparator 112. The integrator 170 accumulates the voltage necessary to maintain the actual speed voltage applied to the comparator 112 equal to the speed command voltage. The output voltage of the integrator 170, gated to the summing junction 94 through a resistor 180 by the analog switch 50, is 4+0.3 volts, 4.3 volts for a speed command of full forward and 3.7 volts for a speed command of full reverse.

When operating in the automatic mode with a speed command of full reverse, the summing junction 94 combines the 0.03 volt drop from the saturation gain stage with the 0.3 volt drop from the integrator to lower the base line of the sawtooth wave applied on line 110 by 0.33 volts so that the output of the summing junction 94 is a sawtooth wave which varies from +3.17 volts to +4.17 volts causing the output of the comparator 32 to provide a square wave having a duty cycle of approximately 20%. This results in the output of the motor 14 being driven in the reverse direction at a speed which is about 60% of the full reverse speed obtained when operating in the manual mode.

When operating in the automatic mode with a speed command of full forward, the summing junction 94 combines the 0.03 volt rise from the saturation gain stage with the 0.3 volt rise from the integrator 170 to raise the base line of the sawtooth wave provided on line 110 by 0.33 so that the output of the comparator 32 is a square wave having a duty cycle of approximately 60%. The output of the motor 14 is now driven in the forward direction at a speed which is about 60% of the full forward speed obtained when operating in the manual mode. It is noted, that the integrator 170 may be calibrated to provide 4±0.5 volts to the summing junction 94 in order to provide the same full operating speed in either the forward or reverse directions of travel as is provided in the manual mode.

The servo-reversible speed control also includes an automatic vibrator start control 182 for use in a vibratory compactor or road roller having front and rear vibrators actuated by respective solenoids 183 and 184. When operating a vibratory compactor, it is essential that the vibrators be off when the actual traveling speed is zero because if the vibrators are operating while the compactor is at a standstill they can damage the pavement. The automatic vibrator start 182 controls the actuation of the vibrators in response to the actual output speed of the hydrostatic transmission 10 as sensed by the pulse pickup device 118 independently of the control handle 56 to avoid this problem.

The actual speed voltage output from the op amp 124 is applied to the noninverting input terminal of a comparator 185, a reference voltage, provided by a potentiometer 186 and resistors 188 and 190, being applied to the inverting input terminal thereof. The potentiometer 186 is set to provide a reference voltage which corresponds to some speed greater than zero at which it is desired that the vibrators be started. The output of the comparator 185 is fed back to the noninverting input terminal thereof through a resistor 192. When the actual speed voltage is greater than the reference voltage, the output of the comparator 185 goes high applying base current to a NPN transistor 194 causing it to conduct current through a switch 196 to a vibrator selector switch 198 when the switch 196 is in the auto position 197.

The vibrator selector switch 198, having switch contacts 200 and 202, allows the operator to select which of the vibrators, the front or the rear, will be operated during travel in the forward and reverse directions, a relay 204 and associated contacts automatically switching operation of the vibrators in response to a change in the sensed direction of travel. When traveling in the forward direction as sensed by the comparator 154, the output of the comparator is high so that base current is applied to a NPN transistor 206 actuating the transistor to draw current through the relay 204. When actuated, the relay 204 closes normally open contacts 212 and 214 and opens normally closed contacts 216 and 218. When the relay contacts 212 are closed current is supplied through the vibrator selector switch contact 200 to the base of a NPN transistor 222 through a resistor 224, actuating the front vibrator solenoid 183.

When the comparator 154 senses the reverse direction of travel, the low output from the comparator 154 is not sufficient to actuate the transistor 206 so that the relay 204 remains off. In the reverse direction of travel, current passes through the switch contact 200 and the normally closed contacts 216 to a NPN transistor 228 through a resistor 230, actuating the rear vibrator solenoid 184.

By changing the position of the selector switch 198 so that the switch contact 202 is closed and the switch contact 200 is open, the rear vibrator solenoid 184 will be actuated during forward travel through relay contacts 214 and the front vibrator solenoid 183 will be actuated during reverse travel through relay contacts 218. The vibrator selector switch may also be positioned so that both vibrators are operating during travel in either direction.

I claim:

1. In a system having means for driving a load in either a first or second direction of motion at a desired output speed, a servo-reversible speed control comprising:
    means for generating a command signal having a magnitude proportional to the desired output speed for motion in the first direction and having a magnitude inversely proportional to the desired output speed for motion in the second direction;
    means for sensing the actual output speed of the driving means and for providing an actual speed signal proportional thereto;
    a pair of amplifiers for receiving the actual speed signal to provide a feedback signal, the feedback signal output from one of said amplifiers having a magnitude proportional to the actual speed signal and the feedback signal output from the other of said amplifiers having a magnitude inversely proportional to the actual speed signal;
    means for sensing the direction of motion and for gating the feedback signal from said one amplifier for sensed motion in the first direction and from said other amplifier for sensed motion in the second direction; and
    means responsive to the command signal and the gated feedback signal for providing a speed control signal to maintain the output speed constant.

2. The servo-reversible speed control of claim 1 wherein said means for providing the speed control signal includes:
    means for comparing the command signal to the gated feedback signal to provide a signal proportional to the difference therebetween; and
    means responsive to the difference signal for accumulating the speed command signal necessary to maintain the actual speed signal equal to the command signal.

3. In a system having means for driving a load in either a first or second direction of motion at a desired output speed, a servo-reversible speed control comprising:
    means for generating a command voltage having a magnitude proportional to the desired output speed for motion in the first direction and having a magnitude inversely proportional to the desired output speed for motion in the second direction;
    means for sensing the actual output speed of the driving means and for providing an actual speed voltage proportional thereto;
    an inverting and a noninverting amplifier for receiving the actual speed voltage to provide a feedback voltage;
    means for sensing the direction of motion and for gating the feedback voltage from the noninverting amplifier for sensed motion in the first direction and from the inverting amplifier for sensed motion in the second direction; and
    means responsive to the command voltage and the gated feedback voltage for providing a speed control signal to maintain the output speed constant.

4. The servo-reversible speed control of claim 3 wherein said means for providing the speed control signal includes:
    means for comparing the command voltage to the gated feedback voltage to provide a voltage proportional to the difference therebetween; and
    means for integrating the difference voltage.

5. The servo-reversible control of claim 4 wherein said integrator means includes a proportional gain control.

6. The servo-reversible speed control of claim 3 wherein said means for providing the speed control signal includes means for generating a speed control voltage in response to the command voltage and the gated feedback voltage and further including a saturation gain stage for providing a step voltage output in response to a small change in the command voltage indicating a change in the direction of motion, said step voltage output being combined with said speed control voltage to provide a speed command signal which overcomes a deadband between the threshold of motion in the first and second directions.

7. The servo-reversible speed control of claim 3 including an acceleration/deceleration limiter coupled to the command voltage generating means for controlling the rate of change of the command voltage to provide an essentially linear rate of acceleration and deceleration.

8. The servo-reversible speed control of claim 7 wherein the acceleration/deceleration limiter includes an operational amplifier having a capacitor coupled to the output thereof, the operational amplifier comparing the command voltage to the voltage across said capacitor and maintaining the output thereof high or low until the capacitor voltage matches said command voltage, the output of said operational amplifier being the command voltage with a controlled rate of change which is applied to said means for providing the speed control signal.

9. The servo-reversible speed control of claim 8 wherein the voltage swing on said capacitor is one-third of the maximum voltage swing out of the operational amplifier.

10. The servo-reversible speed control of claim 8 wherein said capacitor is a non-polar capacitor connected between the output of the operational amplifier and a reference voltage.

11. The servo-reversible speed control of claim 3 wherein said means for sensing the actual output speed includes a pulse pickup device for generating a pulse train, the frequency of which is proportional to the actual output speed and a frequency to voltage converter coupled to said pulse pickup device for providing said feedback voltage.

12. In a system having a hydrostatic transmission driving a load in either a first or second direction of motion at a desired output speed and including means for generating a speed control signal, means responsive to the speed control signal for providing drive current of one polarity for motion in the first direction and drive current of the opposite polarity for motion in the second direction and means responsive to the magnitude and polarity of the drive current for controlling the output speed of the hydrostatic transmission and the direction of motion, a servo-reversible speed control comprising:
  means for providing a command voltage having a magnitude proportional to the desired output speed for motion in the first direction and having a magnitude inversely proportional to the desired output speed for motion in the second direction;
  means for providing an actual speed voltage proportional to the actual output speed of the hydrostatic transmission;
  an inverting and a noninverting amplifier for receiving the actual speed voltage to provide a feedback voltage;
  means for sensing the polarity of the drive current to determine the direction of motion and for gating the feedback voltage from the noninverting amplifier for motion determined to be in the first direction and from the inverting amplifier for motion determined to be in the second direction; and
  means for generating a speed control voltage in response to the command voltage and the gated feedback voltage, the speed command voltage altering the speed control signal to maintain the actual output speed of the hydrostatic transmission constant.

13. The servo-reversible speed control of claim 12 wherein said means for generating said speed control voltage includes:
  means for comparing the command voltage to the gated feedback voltage to provide a voltage proportional to the difference therebetween; and
  integrating means responsive to the difference voltage output from said comparing means for accumulating the control voltage necessary to maintain the feedback voltage equal to the command voltage.

14. The servo-reversible speed control of claim 13 wherein the integrating means includes a proportional gain control.

15. The servo-reversible speed control of claim 12 further including means responsive to a small change in the command voltage indicating a change in the desired direction of motion for providing a step voltage output to be combined with the speed control voltage.

16. The servo-reversible speed control of claim 12 further including an acceleration/deceleration limiter coupled to the means for providing said command voltage, for controlling the rate of change of the command voltage to provide an essentially linear rate of acceleration and deceleration.

17. The servo-reversible speed control of claim 12 for a system wherein said means for providing drive current provides positive polarity drive current on a first line for motion in the first direction and provides positive polarity current on a second line for motion in the second direction and wherein said polarity sensing means includes a comparator for determining the direction of motion, the comparator having a pair of input terminals, one input terminal connected to the first line through an RC filter and the other of the input terminals connected to the second line through an RC filter.

18. The servo-reversible speed control of claim 12 wherein said means for providing the feedback voltage includes
  a pulse pickup device for sensing the actual output speed of the hydrostatic transmission and for generating a pulse train, the frequency of which is proportional to the actual output speed; and
  a frequency to voltage converter coupled to the pulse pickup device for generating a voltage proportional to the frequency of the pulse train, the output of said frequency to voltage converter coupled to the inverting and noninverting amplifiers.

19. The servo-reversible speed control of claim 18 wherein said noninverting amplifier generates a feedback voltage equal to the maximum command voltage for motion in the first direction and said inverting amplifier generates a feedback voltage equal to the minimum command voltage for motion in the second direction when the output speed of the hydrostatic transmission is at a maximum for motion in either the first or second direction.

* * * * *